Patented Aug. 29, 1944

2,357,096

UNITED STATES PATENT OFFICE 2,357,096

TRANSPARENT IRON OXIDE PIGMENTS

Peter Fireman, Lambertville, N. J., assignor, by mesne assignments, to Columbian Carbon Company, New York, N. Y., a corporation of Delaware No Drawing. Application May 30, 1942, Serial No. 445,209

2 Claims. (Cl. 23—200)

This invention relates to pigments and particularly to hydrated ferric oxide pigments characterized by transparency, i. e., the capacity to transmit light.

For many years, ferric oxide pigments have been produced commercially and utilized for a variety of purposes. Such pigments in diverse shades of black, brown, yellow and red can be prepared by oxidation of precipitated ferrous compounds under carefully regulated conditions. All of these pigments which are well known in the art are remarkable for their opacity. They are all highly impervious to and do not, therefore, transmit light. This quality has made such pigments very effective in coating and similar compositions where covering power is an important and especially desirable characteristic.

For other purposes, pigments capable of transmitting light are desirable, and during the researches which I have conducted for many years in the field of ferric oxide pigments, I have sought to develop methods of producing such pigments having the desired quality of transparency. At times I have noted products which seemed to meet the requirement, but the methods of reproducing the desired results proved elusive. Finally, after renewal of earlier researches, I have succeeded in developing procedures which are capable of producing the desired result in brown and yellow pigments.

It is the object of the invention, therefore, to provide transparent ferric oxide pigments and to afford satisfactory and commercially practicable methods for producing such pigments.

Other objects and advantages of the invention will be better understood by reference to the following specification in which I have described preferred embodiments of the invention.

My improved methods follow generally the procedures heretofore employed in the manufacture of pigments by oxidation of ferrous compounds. These methods depend upon precipitation of ferrous compounds from a solution of a soluble ferrous salt and oxidation under regulated temperature conditions usually by the introduction of air while heat is applied to maintain the required temperature.

In the practice of the invention, any soluble ferrous iron salts may be used. The sulphate or chloride are preferred because these are readily obtainable. Any more or less soluble basic precipitating agent may be used, but I prefer lime or soda ash since they are relatively inexpensive. The concentration of the solution of the ferrous compound is not critical. It should be such that when the precipitate is formed the mass will not be too dense to permit air to pass freely through it. The temperature at which the operation is conducted is important and is generally in the neighborhood of 110° F. except as hereinafter noted. The temperature is maintained readily by means of live steam, but any convenient heating system may be employed.

The products obtained by the procedure are mono hydrates of ferric oxide having the composition $Fe_2O_3.H_2O$. One product is a brown pigment having a fairly dark masstone and a yellowish undertone. It is markedly transparent and especially valuable as a pigment in rotogravure inks. It has other important uses. No brown pigment of the composition described has been known heretofore. The other product is a transparent yellow pigment of the same composition. While yellow pigments of like composition have been produced heretofore, such pigments have been highly opaque. The new yellow pigment is differentiated by its transparent quality.

The following examples will serve to illustrate typical procedures which permit the preparation of transparent colored pigments. The operation to produce a yellow transparent pigment is relatively simple. To produce a brown transparent pigment, the same general procedure is followed, but the operation is modified particularly with respect to increase in the temperature during the later stages of operation.

As an example of the procedure to secure a transparent yellow pigment, I prepare a solution of ferrous sulphate of a specific gravity for example of 1.070. This solution is disposed in a suitable receptacle and the temperature of the solution is gradually raised to approximately 110° F., while a base such as soda ash is introduced in sufficient proportion to precipitate most of the iron. The amount of soda ash is calculated so that a few per cent of the iron content remains in solution. Air is introduced simultaneously with the precipitation to agitate the mass and to afford the oxygen necessary for oxidation of the ferrous compound. As the oxidation proceeds, the precipitate is for several hours greenish blue in color. Gradually the color changes to yellowish green and then to greenish yellow and finally to yellow. The operation is continued without raising the temperature substantially above 110° F., until oxidation is far advanced, leaving only a few per cent of the iron in a ferrous state. The precise amount of iron remaining in the ferrous state is not critical. When the operation is completed, the pigment is a clean, bright yellow. It is filtered from the solution, washed and dried. In drying, it is desirable to avoid too high a temperature. The resulting product is soft and finely divided. It may be ground readily to produce a finer material.

When a transparent brown pigment is desired, I prepare a solution of a ferrous compound such as ferrous chloride of a specific gravity for example of 1.055. This solution is disposed in a suitable container, to which a base such as lime is added in proportions sufficient to precipitate nearly all of the iron, leaving only a few per cent unprecipitated. Simultaneously with the introduction of the lime, the temperature of the solution is raised to approximately 110° F., and air is introduced to agitate the mass and to supply the oxygen necessary for oxidation. As the reaction proceeds, the color turns from greenish blue to a deep blue with a greenish tinge. For about an hour, the mass is quite thick, and then begins to thin out gradually, thus permitting more rapid oxidation. The blue color changes more and more to green, and at the end of two or three hours a yellow tinge makes its appearance. Thereafter, the product changes color in 20 to 30 minutes to a dark gray-brown. About this point, without the addition of further heat, the temperature has risen spontaneously to about 116–117° F. When oxidation has about reached the ratio of ferrous to ferric iron of 1:3, and the grayish appearance has disappeared, leaving a mass of dark brown color, heat is gradually applied. From that point the mass begins to acquire a reddish color which becomes more pronounced until a reddish brown product is obtained. Heating is continued and the temperature is allowed to rise to near 212° F. and is held at that temperature until oxidation is far advanced, the ratio of ferrous to ferric iron being of the order of 1:15. The precise ratio is not of particular consequence.

At this point, the desired color is obtained. The heating is discontinued and the product is filtered, washed and dried. In drying, excessively high temperatures should be avoided. The dried pigment is soft and grinds easily.

Both of the pigments as described are characteristically transparent as contrasted with the opaque products formerly obtained by the oxidation of precipitated iron compounds. So far as I am aware, no transparent pigments having the composition of a mono hydrate of ferric oxide have ever been described heretofore or produced for commercial use.

Various changes may be made in the procedure as set forth in the examples forming a part of this specification, without departing from the invention or sacrificing the advantages thereof.

I claim:

1. The method of preparing a transparent brown pigment which comprises, adding to a solution of a ferrous compound a base in proportions such that a few percent only of the iron remains in solution, simultaneously heating the solution to raise the temperature to approximately 110° Fahrenheit and introducing air to agitate the material, discontinuing the application of heat while continuing the introduction of air during a period of from two to three hours, again applying heat when the ratio of ferrous to ferric iron is about 1:3, causing the temperature to gradually rise to about 212° Fahreinheit, holding such temperature until the ratio of ferrous to ferric iron is of the order of 1:15, discontinuing the heating and separating the pigment from the solution.

2. A transparent brown pigment prepared by the method of the foregoing claim.

PETER FIREMAN.